US012780611B2

(12) United States Patent
Christen

(10) Patent No.: US 12,780,611 B2
(45) Date of Patent: Nov. 3, 2026

(54) DOOR SYSTEM

(71) Applicant: Inventio AG, Hergiswil (CH)

(72) Inventor: Jules Christen, Altdorf UR (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 19/113,452

(22) PCT Filed: Sep. 11, 2023

(86) PCT No.: PCT/EP2023/074836
§ 371 (c)(1),
(2) Date: Mar. 20, 2025

(87) PCT Pub. No.: WO2024/068245
PCT Pub. Date: Apr. 4, 2024

(65) Prior Publication Data
US 2026/0103361 A1 Apr. 16, 2026

(30) Foreign Application Priority Data
Sep. 28, 2022 (EP) .................................... 22198382

(51) Int. Cl.
*B66B 13/12* (2006.01)
*B66B 1/34* (2006.01)
*B66B 13/08* (2006.01)

(52) U.S. Cl.
CPC .......... *B66B 13/125* (2013.01); *B66B 1/3492* (2013.01); *B66B 13/08* (2013.01)

(58) Field of Classification Search
CPC ..... B66B 13/125; B66B 13/12; B66B 1/3492; B66B 13/08; B66B 13/22; B66B 13/143; B66B 13/165
See application file for complete search history.

(56) References Cited

U.S. PATENT DOCUMENTS 2,626,018 A 1/1953 Healey
5,005,673 A * 4/1991 Rivera .................... B66B 13/12 187/319

(Continued)

FOREIGN PATENT DOCUMENTS

CN 110395630 A * 11/2019 ............... B66B 5/02
EP 0825146 A1 2/1998

(Continued)

OTHER PUBLICATIONS

Machine translation of EP 3339233 A1 (Erny) (Year: 2018).*

(Continued)

*Primary Examiner* — Minh Truong
*Assistant Examiner* — Michelle M Mudwilder
(74) *Attorney, Agent, or Firm* — Shumaker, Loop & Kendrick, LLP

(57) ABSTRACT

An elevator door system has a shaft door, a car door, a car door drive and a door coupling that couples the car door to the shaft door. An electrically activated car door lock, locks and unlocks the car door in a closed position. The door coupling includes a contact body with a length dimension greater than a spacing between a pair of guide webs and a width dimension smaller than the guide web spacing. The contact body is arranged rotatably on the car door between the guide webs and a lever is connected to a drive means and rotationally to the contact body, the contact body being rotated by a movement of the drive means from a decoupled position, in which the contact body is arranged with play between the guide webs due to the width dimension, into a coupling position, in which the contact body touches the guide webs.

16 Claims, 6 Drawing Sheets

(56) References Cited

U.S. PATENT DOCUMENTS

| | | | | |
|---|---|---|---|---|
| 5,129,486 | A | 7/1992 | Steacy et al. | |
| 5,174,417 | A | 12/1992 | Pilsbury | |
| 5,485,896 | A | 1/1996 | Kowalczyk et al. | |
| 5,880,414 | A | 3/1999 | Jaminet et al. | |
| 5,894,911 | A | 4/1999 | Bozorgzadeh et al. | |
| 5,896,952 | A | 4/1999 | Dohring et al. | |
| 6,006,866 | A | 12/1999 | Horne et al. | |
| 6,843,363 | B2 * | 1/2005 | Schwarze | B65G 45/16 198/497 |
| 2008/0271958 | A1 | 11/2008 | Lelie et al. | |
| 2019/0084806 | A1 * | 3/2019 | Bosshart | B66B 13/30 |
| 2020/0039794 | A1 * | 2/2020 | Kim | B66B 13/08 |
| 2020/0283270 | A1 * | 9/2020 | Beauchaud | B66B 13/185 |
| 2021/0139285 | A1 * | 5/2021 | Liu | B66B 13/12 |
| 2021/0269284 | A1 * | 9/2021 | Talonen | B66B 13/185 |

FOREIGN PATENT DOCUMENTS

| | | | | |
|---|---|---|---|---|
| EP | 1497217 | B1 | 12/2006 | |
| EP | 1765714 | B1 | 8/2011 | |
| EP | 1765712 | B1 | 2/2013 | |
| EP | 3339233 | A1 * | 6/2018 | B66B 13/12 |
| FR | 3011868 | A1 | 4/2015 | |
| WO | 2006014164 | A2 | 2/2006 | |
| WO | WO-2012165179 | A1 * | 12/2012 | B66B 13/18 |

OTHER PUBLICATIONS

Machine translation of CN 110395630 A (Liu et al.) (Year: 2019).*

Rosta AG, Rubber Suspension Elements, catalog, 2021, pp. 1-21, Rosta AG (rosta.com), Hunzenschwil, CH.

* cited by examiner

DOOR SYSTEM

FIELD

The present invention relates to a door system, an elevator having the door system, and a method for operating the elevator.

BACKGROUND

In an elevator, a car is typically moved vertically within a shaft between different floors or levels of a building. On the floors, passengers can enter and exit the car or load or unload other loads to be transported into and from the car. In order to allow access to the car, shaft doors are arranged on the floor and the car also has a car door. The car door comprises at least one car door leaf and the shaft door comprises at least one shaft door leaf. The car door and the shaft door collectively form an openable and closable passage from the car to the floor, or vice versa. So that that the car door remains securely closed while traveling, the car door has a car door lock that locks one or more car door leaves while traveling. The shaft door also has a shaft door lock that keeps one or more shaft door leaves locked, at least in the absence of the car.

The car door also has a drive that is designed to open and close the car door leaves. Typically, this movement of the car door leaves is transmitted by means of a door coupling to the shaft door leaves to be opened in each case on the floor that is visited. For this purpose, a first part of the door coupling on the car door interacts with a second part of the door coupling on the shaft door.

U.S. Pat. No. 5,485,896A shows a simple design of a door coupling. However, this design requires a separate drive for the door coupling. This makes this solution complex to manufacture.

One object of the invention can therefore be seen as providing a cost-effective door system.

SUMMARY

According to a first aspect of the invention, the object is achieved by a door system. The door system has at least one shaft door, one car door, a car door drive and a door coupling for coupling the car door to the shaft door. The car door and the shaft door can be moved between an open position and a closed position. The car door has an electrically activated car door lock, by which the car door can be locked and unlocked in the closed position. The shaft door has a separate electrically activated shaft door lock, by which the shaft door can be locked and unlocked in the closed position. The car door drive includes a motor and a drive means. The car door can be moved from the closed position to the open position and back again by means of the drive means. The door coupling has a first part which is arranged on the car door and has a second part which is arranged on the shaft door. The second part of the door coupling has at least one first vertically aligned guide web protruding from the shaft door and one second vertically aligned guide web protruding from the shaft door. The first and second guide webs are arranged at a guide web distance from each other. The first part of the door coupling has a contact body, wherein the contact body has a length dimension along a length direction that is greater than the guide web spacing. The contact body has a width dimension along a width direction that is smaller than the guide web spacing. The contact body is arranged rotatably on the car door between the first guide web and the second guide web. A lever is connected to the drive means and the lever is connected in a rotationally fixed manner to the contact body, so that the contact body can be rotated by means of a movement of the drive means from a decoupled position, in which the contact body is arranged with play between the first and the second guide web due to the width dimension, into a coupling position, in which the contact body touches the first and the second guide web.

According to a second aspect of the invention, the object is achieved by an elevator. The elevator comprises a door system according to the first aspect of the invention, a position-measuring device, a car and a control device. The position-measuring device detects a position of the car. The control device evaluates the position and controls the opening and closing of the door system.

According to a third aspect of the invention, the object is achieved by a method for operating an elevator according to the second aspect of the invention. The method comprises the steps:

- coupling the car door to the shaft door by the door drive moving the drive means a first distance in the direction of opening and thereby rotating the contact body until the door coupling is coupled.
- unlocking the car door and the shaft door via an electrical signal to the car door lock and the shaft door lock.
- opening the car door by the door drive moving the drive means a second distance in the direction of opening while taking the shaft door with it.

Possible features and advantages of embodiments of the invention can be regarded, inter alia and without limiting the invention, as being based upon the concepts and findings described below.

The car door and the shaft door can together open the passage from any floor of the elevator into the car. The shaft door also closes the shaft as needed and can thus prevent people from falling into the shaft. The car door also closes the car as needed and can thus prevent people in the car from touching the surfaces of the shaft passing by during travel.

The car door and the shaft door can be designed in different ways. The car door and the shaft door can, for example, comprise a rolling door, a folding door, a car door leaf or a shaft door leaf. These designs can be opened either vertically or horizontally.

The car door and the shaft door can preferably be moved together between the open position and the closed position. In particular, when the car is on one floor if the doors open normally, they open together. However, it is also possible to move the doors separately in emergency situations or during servicing.

The door system has the advantage that the door system can be manufactured very cost-effectively thanks to the combination of the electrically activated car door lock, the electrically activated shaft door lock and the simple design of the door coupling. That is, the door coupling serves exclusively to couple the movement of the shaft door to the car door. This means that it can be designed very simply, since it does not for example mechanically activate a locking mechanism.

During travel, a car is preferably moved vertically along the travel path. Once the car has reached a floor, i.e. when the walkable surface of the floor of the car and the walkable surface of the floor on the floor are substantially at the same height, and optionally when the car has substantially stopped, the car door is opened by the car door drive by means of the drive means. The fact that the car is at the height of a floor, and, optionally, that the car has substantially stopped, can be determined by the position-measuring device. The position-measuring device determines the position and optionally the speed of the car along the travel path. The position-measuring device transmits position measurement data to a control unit of the elevator. The control unit can be at least partially integrated into the position-measuring device. The control unit can control the door drive and thus the opening and closing of the car door and the shaft door. The control unit can take into account the position measured by the position-measuring device.

The length direction is the straight-line connection between two points of the contact body which have a maximum distance from each other, preferably in a projection onto the plane of the shaft door or the car door. The width direction here is parallel to the distance between two planes between which the contact body lies, so that the contact body is touched by both planes. Preferably, the two planes are also perpendicular to the car door or the shaft door and are parallel vertically, i.e. perpendicular to the direction of door movement, in particular when the contact body is in the decoupled position.

The contact body contacts the first and second guide webs in the coupling position because the longitudinal dimension along the length direction is longer than the guide web distance between the first guide web and the second guide web. Therefore, when the contact body rotates, it contacts the first and second guide webs.

The first part of the door coupling is arranged on the car door. The first part of the door coupling has the contact body. The length direction of the contact body is aligned along the direction of travel, i.e. vertically, during travel. The width direction is preferably perpendicular to the length direction and is thus aligned horizontally in this orientation. The contact body is spaced so far from the car door, and the first and second guide webs protrude so far from the shaft door, that the contact body is at least partially mounted between the first guide web and the second guide web. The contact body is at a distance from the shaft door and the guide webs are at a distance from the car door.

Since the width dimension is smaller than the guide web spacing, the contact body can pass the second part of the door coupling, in particular the first guide web and the second guide web, without contact. For this purpose, the contact body is preferably arranged centrally between the first guide web and the second guide web. This means that there is no noise or impact during the car's travel when the first part of the door coupling passes a second part of the door coupling, which is preferably attached to each shaft door.

Preferably, the first guide web is arranged parallel to the second guide web.

According to a preferred embodiment, the contact body is made from an elastomer. Elastomers can be understood in particular as vulcanizates of natural or synthetic rubber. The primary advantage of this is that the coupling is very quiet.

The first step of opening the car door involves coupling the car door and the shaft door. In order to couple the car door with the shaft door, the contact body is rotated by an angle of rotation. As a result, the length direction of the contact body is rotated and the contact body touches the first and second guide webs with one contact point each. This rotation is caused by the lever, which is connected to the contact body in a rotationally fixed manner. Preferably, the contact body and the lever are designed as a unit and in particular are rotatably borne on a surface of the car door. The bearing can be realized, for example, via a bearing pin that is attached directly to the car door or to a base attached to the car door. One end of the lever is connected to the contact body, and the other end of the lever is preferably connected in an articulated manner to the drive means of the car door drive. In order to rotate the length direction from the vertical orientation to the rotated orientation, the motor of the door drive moves the drive means by a first distance. The drive means is displaced so far that the lever is rotated by the coupling angle and the contact body is thus also rotated by the coupling angle. Since the contact body is fixedly connected to the lever, the contact body and the lever each rotate by the same common coupling angle.

If the contact body is not yet coupled, the lever preferably deviates from the vertical by a lead angle. When the contact body is coupled, the lever preferably extends substantially vertically.

The car door and the shaft door are coupled as soon as the contact body touches the first guide web and the second guide web.

The drive means is characterized in that at least parts of the drive means move linearly along the door opening direction, and that by means of the indirect coupling of the drive means via the contact body and the lever to the car door, the car door is moved by the drive means. The drive means can be designed, for example, as a spindle drive, rack and pinion drive, scissor linkage, hydraulic cylinder or pneumatic cylinder.

According to a preferred embodiment, the drive means is designed as a drive means rotating around a first roller and a second roller, and preferably the first roller is driven by the door drive.

Both rollers are preferably arranged on the car door transom. The first roller is preferably arranged near the door drive. The second roller is arranged opposite the first roller on the door transom. The drive means that runs over the roller can be a chain, a rope, a belt or a toothed belt.

Preferably, the length direction of the contact body is rotated from the vertical direction by a coupling angle between 10° and 80° in the coupled state. More preferably, the coupling angle is between 15° and 40°. Still more preferably, the coupling angle is 30°. This has the advantage that the first distance that the drive means travels for the coupling is short. The contact body touches the first guide web at a first contact point and the second guide web at a second contact point. The two contact points prevent further rotation of the contact body. This results in the advantageous effect that when the door is subsequently opened, a force applied by a door closing device increases or at least maintains a contact force at the contact points between the contact body and the guide webs. As a result, all elements are braced against one another, from the motor of the car door drive, to the drive means, the contact body, the guide webs and the door closing device of the shaft door. They are thus all pressed together so that the movement of the motor is transmitted to the car door and the shaft door without play.

The coupling angle can be the same as the lead angle. The lever is then substantially vertically aligned in the coupled position.

Alternatively, the coupling angle can be between 70° and 110°, or preferably 90°. For this purpose, the contact body or the lever has a stop that prevents further rotation after the coupling angle is reached. In addition, in such a case the lead angle is preferably 45°. This causes the lever to move 90° between the coupled position, which deviates by 45° from a vertical direction, and the uncoupled position, which also deviates by 45° from a vertical direction. The coupled and uncoupled positions are therefore symmetrical to each other with respect to the vertical direction.

In the embodiment in which the length direction is rotated by approximately 90° from the vertical direction, it is particularly advantageous that the high degree of friction of the elastomers holds the contact body in the position rotated by 90°. The elastomers generate large frictional forces because the contact body is clamped between the first guide web and the second guide web. For this purpose, in this case the length dimension is only slightly, preferably between one per thousand and 5%, larger than the guide web spacing.

In both alternatives, the contact points then prevent a movement of the shaft door relative to the car door.

Since the car door and the shaft door are connected to each other when coupled, the shaft door lock can be opened. It is advantageous that the car door lock and the shaft door lock can be activated electrically. The power for unlocking the electrically activated car door lock can be provided directly in the car by a control unit. Likewise, a control unit on the floor or in the machine room can provide the power to activate the shaft door lock. Preferably, both locks have a monitoring device that monitors the position of the locks.

The shaft door lock and the car door lock can have substantially the same design. The electrical activation of the locks is based on the principle that a control device generates signals that cause the shaft door lock or the car door lock to open or close. Preferably, the unlocking is carried out directly via the power supply of a lifting magnet; that is, a lifting magnet is preferably energized by the control device, which magnet thereby opens the lock. The power can be generated directly in or at the control device. Alternatively, the control device can send a command via a bus system to an activation component, whereupon the activation component switches on the current, which then activates the lifting magnet.

The signal line to the shaft door lock and the signal line to the car door lock can be realized directly via one cable. Alternatively, a bus system can be used, which then for example sends additional status data from the shaft door lock or the car door lock back to the elevator control device. Status data include, for example, the state of the car door lock or the shaft door lock, data on the duration of the door movements, or the power consumption of the drive.

In an advantageous embodiment, the lifting magnet is supplied with power so that the lock opens by removing a latch from engagement with a latch stop. As soon as the power supply is interrupted, the latch falls back into engagement with the latch stop, for example by a spring or a weight pretensioning the latch towards the position in which it is in engagement with the latch stop. In addition, the latch can be designed in such a way that the locking mechanism can be locked when the power supply is switched off by moving the latch over the latch stop by means of a one-sided chamfer. It can thus function like a snapper.

As soon as the car door lock and the shaft door lock are opened, the door drive can move the drive means a second distance in the direction of opening. As a result, the door drive moves the car door together with the shaft door into the open position. As soon as the two doors have left the door locking region, the activation of the car door locking and the shaft door locking can be terminated. This can save energy.

According to a preferred embodiment, the method further comprises the step:

closing the car door and the shaft door.

Moving the first car door leaf into the closed position, i.e. closing the doors, is done in reverse. Here the car door lock and the shaft door lock can preferably remain deactivated if each of the latches are chamfered.

According to a preferred embodiment, the method further comprises the steps:

- closing the car door by the car door drive moving the drive means a third distance in the direction of closing until the first car door is closed,
- locking the car door and the shaft door and uncoupling the door coupling by the car door drive moving the drive means a fourth distance in the closing direction.

The door drive moves the drive means a third distance and thus closes the doors through this movement. Preferably, the movement is controlled in such a way that when the closed position is reached, the speed of the movement is very low or the door drive preferably stops briefly. This prevents the doors from colliding with each other, and the doors close quietly. The lock can remain deactivated when closing. For this purpose, the car lock and the shaft lock can, for example, have a snap mechanism, which is preferably implemented by a chamfered latch. The car lock and the shaft lock are preferably activated when closing in order to reduce the noises when locking and to prevent, for example, snapping noises. Otherwise, the snap mechanism could cause a snapping noise, for example when passing the locking stop. After locking, the drive means is moved a fourth distance by the door drive and the car door is decoupled from the shaft door. The car can now be moved safely along the travel path again.

The latch stop can be designed as a nose on the car door or as a recess in the car door. The latch is preferably pretensioned by a spring in such a way that the latch is potentially in engagement with the latch stop when the car door latch or shaft door latch is not activated.

According to a preferred embodiment, the car door has at least one first car door leaf and the shaft door has at least one first shaft door leaf.

The first car door leaf and/or the first shaft door leaf are a fixed door leaf. Preferably, a door leaf is flat and rectangular and is arranged so that it can be moved transversely to the direction of passage through the door. The first and second guide webs can be attached to the shaft door leaf. The bearing or the base used for the bearing of the contact body can be arranged on the car door leaf.

According to a preferred embodiment, the car door has a second car door leaf, and the shaft door has a second shaft door leaf, wherein a first door coupling couples the first car door leaf to the first shaft door leaf, and in particular a second door coupling couples the second car door leaf to the second shaft door leaf.

In a first alternative embodiment, the first car door leaf and the second car door leaf can be moved telescopically. Here, the first car door leaf moves faster, in particular twice as fast, as the second car door leaf. It is advantageous here that the door coupling and the car door lock are attached to the first door leaf, which moves faster. Analogously, the coupled first shaft door leaf preferably moves twice as fast as the second shaft door leaf. The movement of the second shaft door leaf is effected by a mechanism that transfers the movement of the first shaft door leaf to the second shaft door leaf, reduced by 50%.

In a second alternative embodiment, a second door coupling can couple the second car door leaf to the second shaft door leaf. This is particularly advantageous for doors that open centrally. With centrally opening doors, the door leaves open away from each other in opposite directions. This means that the two shaft door leaves do not have to be coupled to one another, but can move independently of each other. This saves an additional mechanism at each shaft door, such as circulating cables, which would result from this coupling.

In other words, the car has a second door coupling for a second car door leaf and a second shaft door leaf.

The use of the two shaft door leaves is preferably analogous to the use of the two car door leaves.

According to a preferred embodiment, the contact body, the first guide web and the second guide web are arranged above the car door and/or above the shaft door.

Above the car door or the shaft door here means that the door coupling is located above an infinitely wide horizontal plane which lies tangentially on an upper end of the shaft door and/or the car door and in particular an upper end of the first shaft door leaf and/or the first car door leaf.

Since the door coupling is arranged above the car door leaf or the shaft door leaf, at least parts of the door coupling can be arranged vertically above the door, and less space is required between the car door and the shaft door. This allows the shaft door leaf and the car door leaf to be arranged very close to each other because, for example, the lever or a support structure for the guide webs can be arranged outside the gap between the car door and the shaft door. The shaft door and the car door are therefore positioned very close to each other, leaving more space to make the interior of the car larger.

According to a preferred embodiment, the door system has a pretensioning device which applies a pretensioning force to the contact body in the direction of the decoupled alignment.

The pretensioning force in the decoupled alignment ensures that the contact body does not unintentionally rotate out of this alignment during travel. Such rotation could, when passing a floor, result in the guide elements there being touched.

The pretensioning force can be designed in such a way that, for example, a torsion spring is connected to the contact body, the unstressed position of which is aligned such that the contact body is aligned along the direction of travel. Alternatively, a tension spring can be connected to the contact body in such a way that the shortest length is achieved when the contact body is aligned along the travel direction. Another alternative embodiment consists in arranging a stop between the car door and the contact body. The lever is pretensioned by a spring in such a way that it is pressed against the stop. When the lever rests against the stop, the contact body is aligned along the travel direction.

According to a preferred embodiment, the pretensioning device is designed as an elastomer torsion spring. Such elastomer torsion springs are sold, for example, by the company Rosta as Rosta-Element. They act simultaneously as a bearing element and as a return spring.

According to a preferred embodiment, the first guide web and the second guide web have a common guide web base.

The common guide web base can be a separate element, such as a guide web carrier. The guide web carrier determines the guide distance. Preferably, it also has holes and/or threads to attach the guide webs to the guide web support and to attach the guide web support to the shaft door.

Alternatively and preferably, the common guide web base can be formed in that the first guide web, the common guide web base and the second guide web together form a body. Preferably, they form a U-profile, with the common guide web base comprising the middle part of the U-profile. The U-profile can be designed in such a way that the guide distance is fixed and therefore especially cannot be changed. In addition, the guide web base can be used to attach the U-profile to the shaft door, for example with screws. The guide web base can also have elongated holes that allow the U-profile to be easily arranged and aligned in the correct position. That is, in such a way that the contact body is located in the middle between the first guide web and the second guide web, and that the guide webs are aligned along the travel path.

According to a preferred embodiment, a connector connects the lever to the drive means, and the connector connects a first end of the drive means to a second end of the drive means.

On the one hand, the connector closes the circulating drive means to form a closed circle and allows the length of the drive means to be adapted to the distance between the rollers. In addition, the connector preferably has a pin or a bore, with which an articulated connection to the lever can be achieved.

According to a preferred embodiment, the door system has a door closing device on the shaft door, wherein the force of the door closing device is greater than the tensile force which the drive means exerts on the lever in order to move the contact body into the coupling position. Door closing weights or door closing springs can be used as door closing devices.

In other words, the drive means will move the lever to bring the contact body into the coupling position. The force to be applied for this is less than the closing force of the door locking device. This ensures that the shaft door and the car door are not opened when the coupling position is reached. This prevents the latch from being loaded while it is still locked. This ensures that the latch can be easily removed from engagement upon activation, i.e. the opening of the locks. As soon as the drive means moves the lever further, the force of the drive means increases above the closing force, and the car door and the shaft door coupled to the car door open. If the drive means were to open the car door before the lock was unlocked, at least one of the car door or the shaft door would come into contact with the corresponding latch, so that the latch could no longer be brought into the open position due to the frictional force. This effect can occur at the car door latch as well as at the car door or at the shaft door latch at the shaft door.

According to a preferred embodiment, the method further comprises the step:

after coupling and before unlocking, the door drive is reset to relieve the locking mechanism.

By relieving the load on the locking mechanism, it is possible to equip the locking mechanism with a weak, and therefore cost-effective, actuator.

This is particularly advantageous if the longitudinal direction is rotated by approximately 90° from the vertical direction and the force required on the lever for this is greater than the closing force of the door closing device. In this case, this ensures that the latch is not loaded and is easy to open.

Further advantages, features, and details of the invention can be found in the following description of embodiments and with reference to the drawings, in which like or functionally like elements are provided with identical reference signs. The drawings are merely schematic and are not to scale.

DETAILED DESCRIPTION

Figure 1:
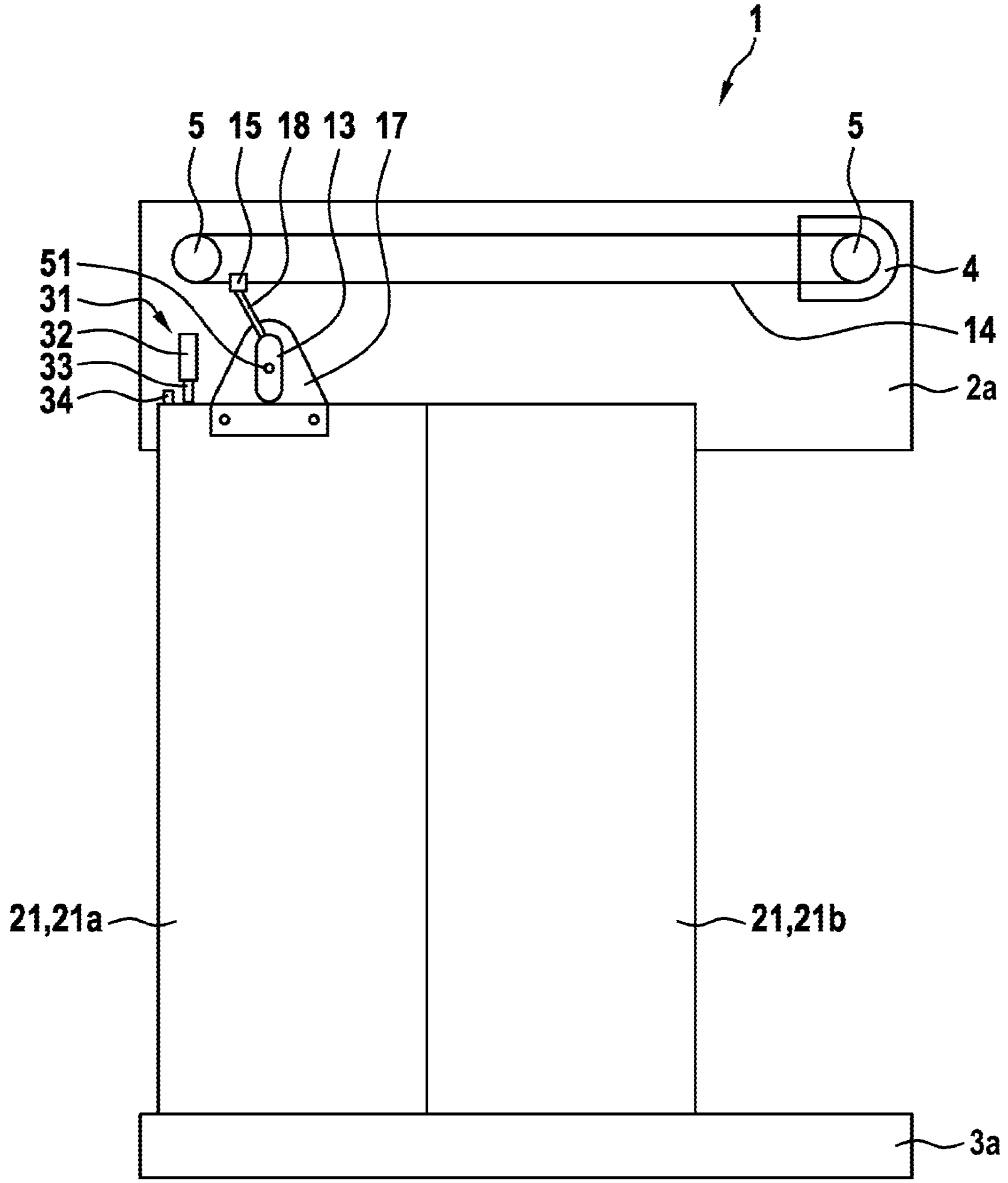
FIG. 1 shows a car door according to the invention.
Figure 6:
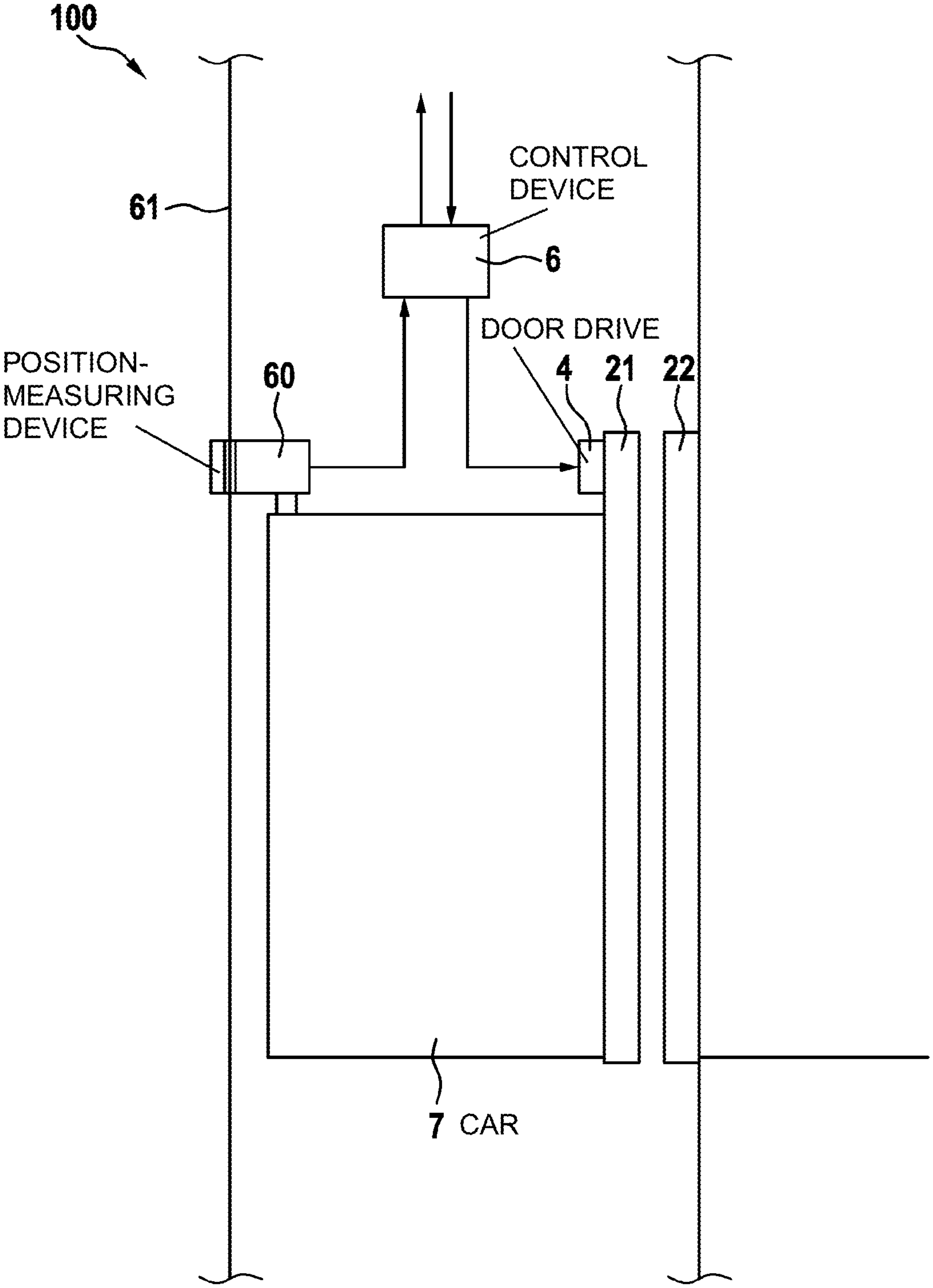
FIG. 6 shows an elevator with the car door and shaft door according to the invention.

FIG. 1 shows the car door 21 of the elevator 100 of FIG. 6. The door system 1 is designed as a telescopically opening car door 21. A first car door leaf 21*a* opens to the right twice as fast as a second car door leaf 21*b*. The first and second car door leaves 21*a*, 21*b* are guided at the lower end on a car door sill 3*a*. When open, both car door leaves 21*a*, 21*b* would be located on the right under the door drive 4. The mechanism which causes the first car door leaf 21*a* to move twice as fast as the second car door leaf 21*b* in the telescopically opening doors is not shown. A door drive 4 is attached to the car door transom 2*a*. The door drive 4 moves a drive means 14 via a roller 5. The drive means 14 is guided over the two rollers 5, which are arranged at substantially opposite ends of the door transom 2*a*. A connector 15 connects the ends of the drive means 14 to one another and also establishes a connection between the drive means 14 and the lever 18. The lever 18 is connected to the contact body 13 in a rotationally fixed manner. They thus form a unit. The unit consisting of lever 18 and contact body 13 is mounted on a bearing 51 which is located on the base 17. The base 17 is designed such that the base 17 and the lever 18 are located substantially vertically over and above the first car door leaf 21*a*. In such a way that substantially only the contact body 13 protrudes beyond a projection of the first car door leaf 21*a* in order to be able to couple with the opposite first shaft door, or the first and second guide webs attached thereto.

The first car door leaf 21*a* has a latch stop 34. The latch 33 of the car door lock 31 engages with the latch stop 34 when the car door lock 31 is not activated. As a result, the car door 21 and in particular the first car door leaf 21*a* is locked. The car door lock 31 is activated by activating the car door lock actuator 32. For this purpose, the actuator 32 can have a lifting magnet which is energized for activation, and the lifting magnet then lifts the latch 33 out of engagement with the latch stop 34 via a magnetic force. The weight of the latch or the force of a spring can act as a counterforce.

Figure 2:
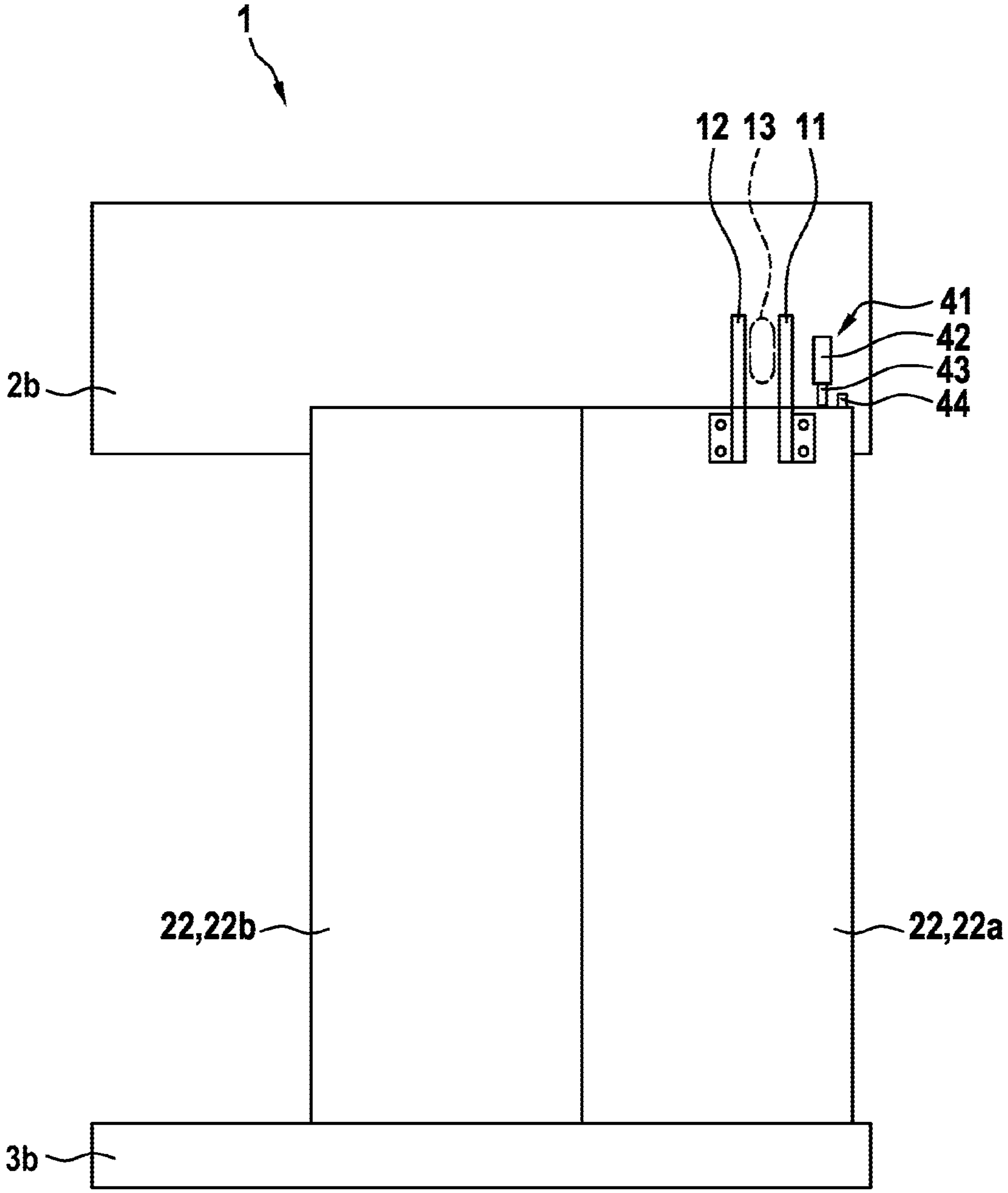
FIG. 2 shows a shaft door fitting the car door shown in FIG. 1.

FIG. 2 shows the shaft door 22 which would be arranged together with the car door 21 of FIG. 1 in a door system 1. The door system 1 comprises the combination of the car door 21 as shown in FIG. 1 and the shaft door 22 fitting therewith, as shown in FIG. 2. The components of the door system 1 shown in FIG. 2 are substantially laterally reversed relative to the representation of similar components of the car door 21 in FIG. 1 because the shaft door shows a view from the opposite direction.

The shaft door 22 also opens telescopically. The first shaft door leaf 22*a* and the second shaft door leaf 22*b* are guided along the shaft door sill 3*b* and the shaft door transom 2*b*. The shaft door lock 41 is also constructed analogously to the car door lock. A shaft door latch 43 is, in the non-activated state, in engagement with a shaft latch stop 44. The actuator 42 of the shaft door lock can be energized to lift the latch 43 out of engagement with the latch stop 44.

A first guide web 11 and a second guide web 12 are attached to the first shaft door leaf 22*a*. The two guide webs 11, 12 are arranged such that the contact body 13 is arranged between the first guide web 11 and the second guide web 12. The contact body 13 is shown in dashed lines because it is attached to the car door 21 and would therefore not actually be visible when looking at the shaft door 22. It is therefore shown where the contact body 13 would be located if the car 7 (see FIG. 6) were on the same floor. The guide webs 11, 12 are attached independently of one another to the first shaft door leaf 22*a*. In addition, a part of the guide webs 11, 12 is mounted vertically above the first shaft door leaf 22*a*. Only enough of the guide webs 11, 12 protrudes beyond the first shaft door leaf 22*a* to enable a coupling with the opposite contact body 13.

Figure 3:
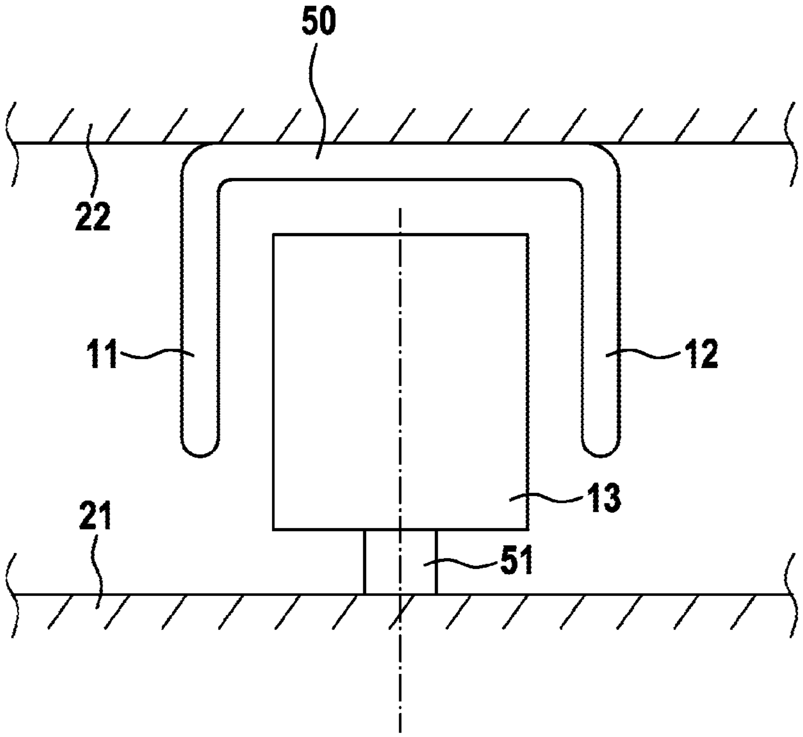
FIG. 3 shows a horizontal section through the door coupling.

FIG. 3 shows the horizontal section through a non-activated door coupling.

The contact body 13 is at a distance from the guide webs 11 and 12. The car can therefore pass the floor without touching the guide webs 11 or 12.

The guide webs 11 and 12 show a preferred embodiment. The first guide web 11 is connected to the second guide web 12 via a guide web base 50.

The guide web base 50 of the two guide webs 11, 12 is attached directly to the front (surface facing car door 21) of the shaft door 22. In a more advantageous arrangement, the guide web base 50 would be mounted on top of the shaft door 22 and only the guide webs 11 and 12 would protrude into the gap between the shaft door 22 and the car door 21.

The situation is similar with the bearing 51 of the contact body 13. The bearing 51 of the contact body 13 is mounted directly on the front (surface facing shaft door 22) of the car door 21. In a more advantageous arrangement, the bearing 51 would be mounted on top of the car door 21 and only the contact body 13 would protrude into the gap between the shaft door 22 and the car door 21.

Figure 4:
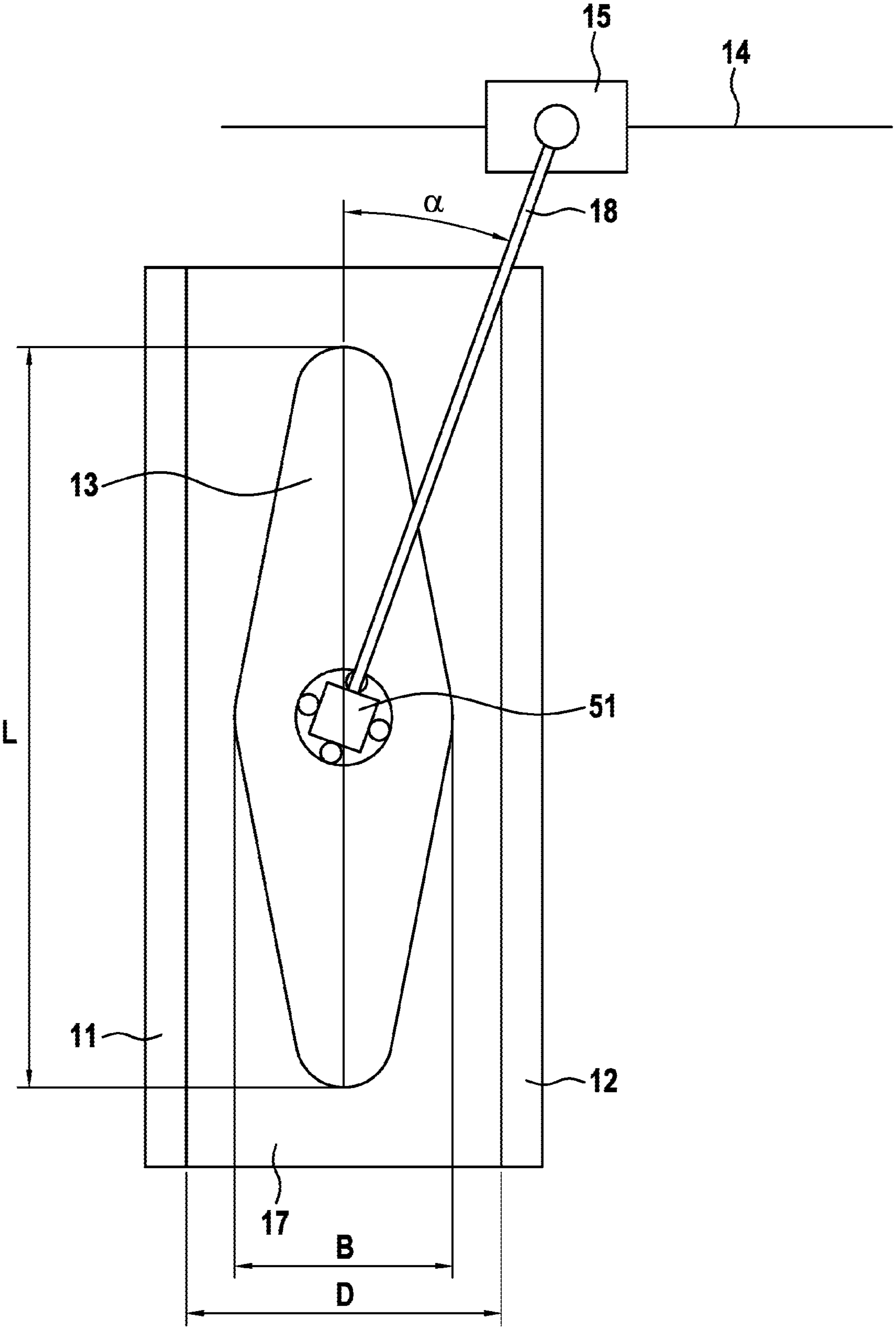
FIG. 4 shows a view of the deactivated door coupling in coupled position.
Figure 5:
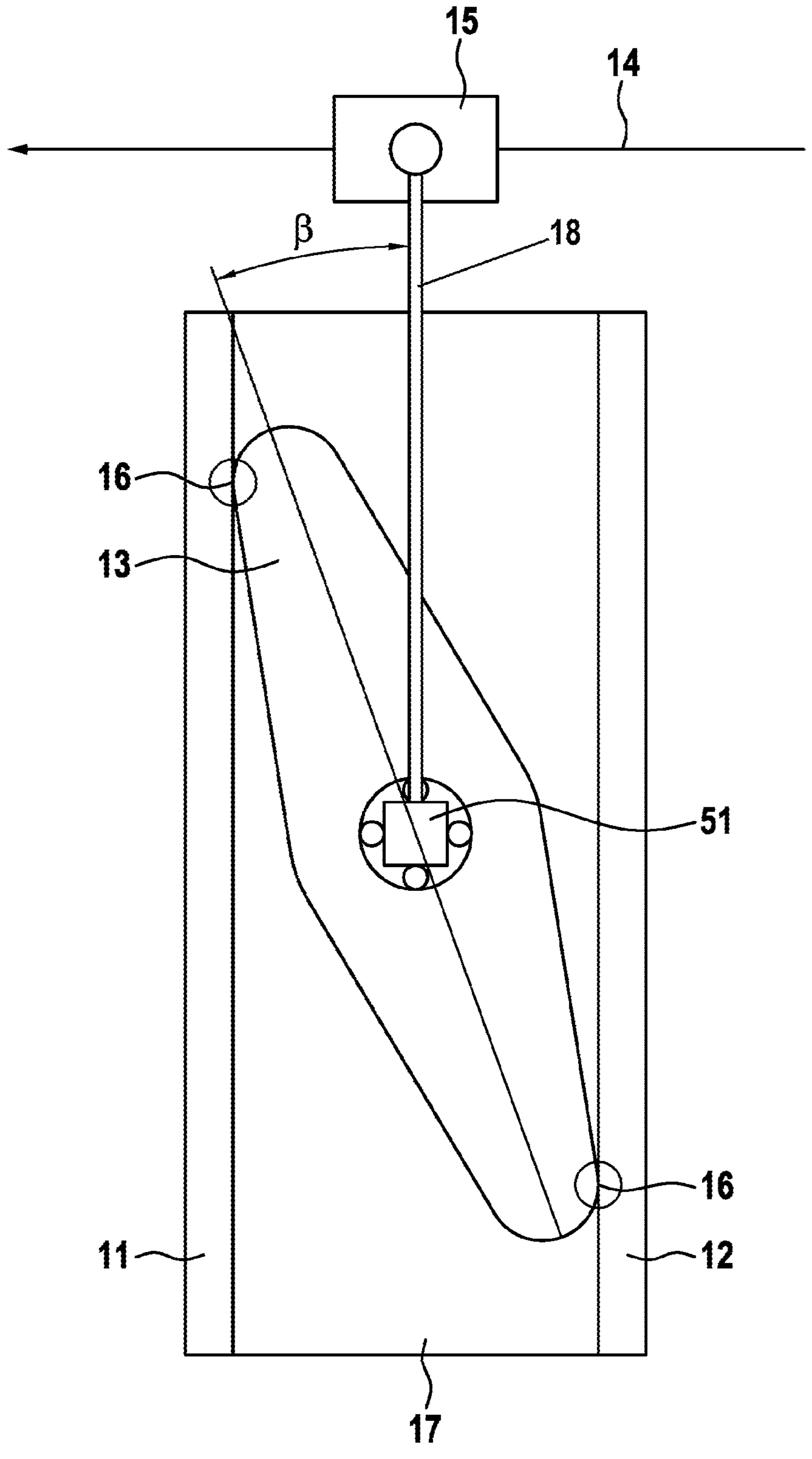
FIG. 5 shows a view of the activated door coupling in coupled position.

FIG. 4 and FIG. 5 show in detail how the contact body 13 and the guide webs 11 and 12 interact. FIG. 4 shows the situation of the deactivated door coupling. This allows the elevator to be moved without the contact body 13 on the car door touching the guide webs 11 and 12 on the shaft door. FIG. 5 shows the situation of the activated door coupling, in which the shaft door and the car door are coupled.

The contact body 13 has a length dimension L along a length direction and a width dimension B along a width direction.

The guide webs 11 and 12 are arranged parallel to each other with a guide web spacing D.

The lever 18 and the contact body 13 are connected to each other at the lower end of the lever 18. In the center of the contact body 13 is the bearing 51 of the contact body 13. The bearing 51 is designed in the form of an elastomer torsion spring pretensioning device such that the situation shown in FIG. 4 corresponds to an untensioned position of the elastomer torsion spring. The lead angle $\alpha$ spans between the vertical and the lever 18. The upper end of the lever 18 is attached to a connector 15. The connector 15 transmits the movement of the drive means 14 to the lever 18. Preferably, it also holds the two ends of the drive means together, often in the form of a traction cable or toothed belt.

To activate the door coupling, the drive means 14 is moved to the left by the door drive 4. When the door coupling is activated, the contact body 13 touches the guide webs 11 and 12 with two contact points 16. A first contact point 16 touches the first guide web 11 and a second contact point 16 touches the second guide web 12. The contact body 13 is now rotated by a coupling angle $\beta$. The coupling angle $\beta$ is preferably the same size as the lead angle $\alpha$. Thus, the lever 18 in FIG. 5 is aligned vertically.

Once the door coupling is activated, the car door lock 31 and the shaft door lock 41 can be unlocked. In order to open the car door 21 and the shaft door 22 together against the force of the door closing device on the shaft door 22, the drive means 14 is moved further to the left. As a result, the force at the contact point 16 between the contact body 13 and the first guide web 11 increases and the car door 21 and the shaft door 22 open together.

The closing of the car door 21 and the shaft door 22 takes place in the reverse order. It is advantageous here to select the course of movement of the drive means 14 such that the drive means stops briefly at the position shown in FIG. 5. Thus, the car door 21 and the shaft door 22 also stop in the position in which they can be locked. As a result, the closing process is quiet.

FIG. 6 shows a side view of the elevator 100. The car 7 has a car door 21, which is opposite a shaft door 22. A control device 6 receives signals from a position-measuring device 60 which determines the position along a positioning belt 61 arranged in the shaft. The control device 6 controls the door drive 4 and the car door lock 31 and the shaft door lock 41. The signal to the shaft door lock can be transmitted to the shaft door via another control device in the machine room, or for example directly to the shaft door via radio. The control unit 6, which is preferably arranged on the car 7, can for example also forward the signals from the position-measuring device 60 to a main control unit, for example in a machine room, or receive and execute commands for opening or closing doors from the main control device.

Finally, it should be noted that terms such as "having," "comprising," etc., do not preclude other elements or steps, and terms such as "a" or "one" do not preclude a plurality. Furthermore, it should be noted that features or steps which have been described with reference to one of the above exemplary embodiments may also be used in combination with other features or steps of other exemplary embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A door system for an elevator, the door system having a shaft door, a car door, a car door drive and a door coupling that couples the car door to the shaft door, the car door and the shaft door when coupled being movable between an open position and a closed position, the door system comprising:

the car door having an electrically activated car door lock that locks and unlocks the car door when the car door is in the closed position;

the shaft door having an electrically activated shaft door lock that locks and unlocks the shaft door when the shaft door is in the closed position;

wherein the car door drive includes a motor and a drive means, the drive means moving the car door from the closed position to the open position and back to the closed position;

wherein the door coupling has a first part arranged on the car door and a second part arranged on the shaft door;

wherein the second part of the door coupling has a vertically aligned first guide web projecting from the shaft door and a vertically aligned second guide web projecting from the shaft door, the first and second guide webs being arranged at a fixed guide web spacing from one another;

wherein the first part of the door coupling has a contact body, the contact body having a length dimension along a length direction that is greater than the guide web spacing, and the contact body having a width dimension along a width direction that is smaller than the guide web spacing;

wherein the contact body is arranged rotatably on the car door between the first guide web and the second guide web when the car door and the shaft door are arranged together;

a lever connected to the drive means and the lever being rotationally fixed to the contact body; and wherein the contact body is rotated, by movement of the drive means, from a decoupled position in which the contact body is arranged between the first and second guide webs with play due to the width dimension being smaller than the guide web spacing, into a coupling position in which the contact body touches the first and second guide webs.

2. The door system according to claim 1 wherein the car door has at least one car door leaf and the shaft door has at least one shaft door leaf.

3. The door system according to claim 1 wherein the contact body, the first guide web and the second guide web are arranged above the car door and/or above the shaft door.

4. The door system according to claim 1 including a pretensioning device that applies a pretensioning force to the contact body in a direction of the decoupled position.

5. The door system according to claim 4 wherein the pretensioning device is an elastomer torsion spring.

6. The door system according to claim 1 wherein the first guide web and the second guide web have a common guide web base.

7. The door system according to claim 1 wherein the drive means rotates around a first roller and a second roller.

8. The door system according to claim 7 wherein the first roller is driven by the door drive.

9. The door system according to claim 7 including a connector connecting the lever to the drive means, and the connector connecting a first end of the drive means to a second end of the drive means.

10. The door system according to claim 1 wherein the shaft door is biased toward the closed position by a closing force, and wherein a tensile force exerted by the drive means on the lever to move the contact body into the coupling position is less than the closing force biasing the shaft door towards the closed position such that the shaft door remains in the closed position when the contact body is moved into the coupling position.

11. The door system according to claim 1 wherein the car door has a first car door leaf and a second car door leaf, the shaft door has a first shaft door leaf and a second shaft door leaf, the door coupling couples the first car door leaf to the first shaft door leaf.

12. An elevator comprising:

a car;

the door system according to claim 1;

a position-measuring device that detects a position of the car; and a control device receiving the detected position from the position-measuring device and evaluating the position to control movement of the door system between the open position and the closed position.

13. A method for operating the elevator according to claim 12 comprising steps of:

coupling the car door to the shaft door by operating the car door drive to displace the drive means a first distance in a direction of the open position and thereby rotate the contact body until the door coupling is coupled;

unlocking the car door and the shaft door by sending an electrical signal to the car door lock and the shaft door lock; and opening the car door and the shaft door by operating the car door drive to displace the drive means a second distance in the direction of open position.

14. The method according to claim 13 including, after the coupling and before the unlocking, resetting the door drive to relieve the car and shaft door locks.

15. The method according to claim 13 including closing the car door and the shaft door to the closed position.

16. The method according to claim 13 comprising further steps of:

closing the car door by operating the car door drive to move the drive means a third distance in a direction of the closed position until the car door and the shaft door are closed;

locking the car door and the shaft door; and uncoupling the door coupling by operating the car door drive to move the drive means a fourth distance in the direction of the closed position.

* * * * *